United States Patent
Haberberger et al.

(10) Patent No.: US 7,316,105 B2
(45) Date of Patent: Jan. 8, 2008

(54) STEAM POWER PLANT

(75) Inventors: Georg Haberberger, Bubenreuth (DE); Christoph Kail, Meschede (DE)

(73) Assignee: Siemens Aktiengesellschaft, Munich (DE)

( * ) Notice: Subject to any disclaimer, the term of this patent is extended or adjusted under 35 U.S.C. 154(b) by 247 days.

(21) Appl. No.: 10/519,625

(22) PCT Filed: May 15, 2003

(86) PCT No.: PCT/EP03/05123

§ 371 (c)(1),
(2), (4) Date: Aug. 10, 2005

(87) PCT Pub. No.: WO2004/003348

PCT Pub. Date: Jan. 8, 2004

(65) Prior Publication Data

US 2006/0021322 A1 Feb. 2, 2006

(30) Foreign Application Priority Data

Jun. 28, 2002 (EP) .................................. 02014453

(51) Int. Cl.
*F02C 3/30* (2006.01)

(52) U.S. Cl. .................... 60/39.17; 60/39.52; 60/39.55
(58) Field of Classification Search ............... 60/39.17, 60/39.52, 39.53, 39.54, 39.55
See application file for complete search history.

(56) References Cited

U.S. PATENT DOCUMENTS

| 2,678,531 | A | * | 5/1954 | Miller | 60/39.55 |
| 2,832,194 | A | * | 4/1958 | Kuhner | 60/39.17 |
| 4,148,185 | A | * | 4/1979 | Somers | 60/39.17 |
| 5,687,559 | A | | 11/1997 | Sato | |
| 5,775,091 | A | | 7/1998 | Bannister et al. | |
| 5,953,900 | A | | 9/1999 | Bannister et al. | |
| 5,956,937 | A | | 9/1999 | Beichel | |

* cited by examiner

*Primary Examiner*—L. J. Casaregola

(57) ABSTRACT

The invention relates to an inventive steam power plant comprising at least one steam turbine and a steam generator. According to the invention, a firing device is located downstream of the steam generator and upstream of the steam turbine and/or downstream of a first turbine phase and upstream of a second turbine phase of the stream turbine in the direction of the stream flow and the steam flow can be heated in a combustion chamber of the firing device by being mixed with a heating gas that can be generated in the combustion chamber.

4 Claims, 1 Drawing Sheet

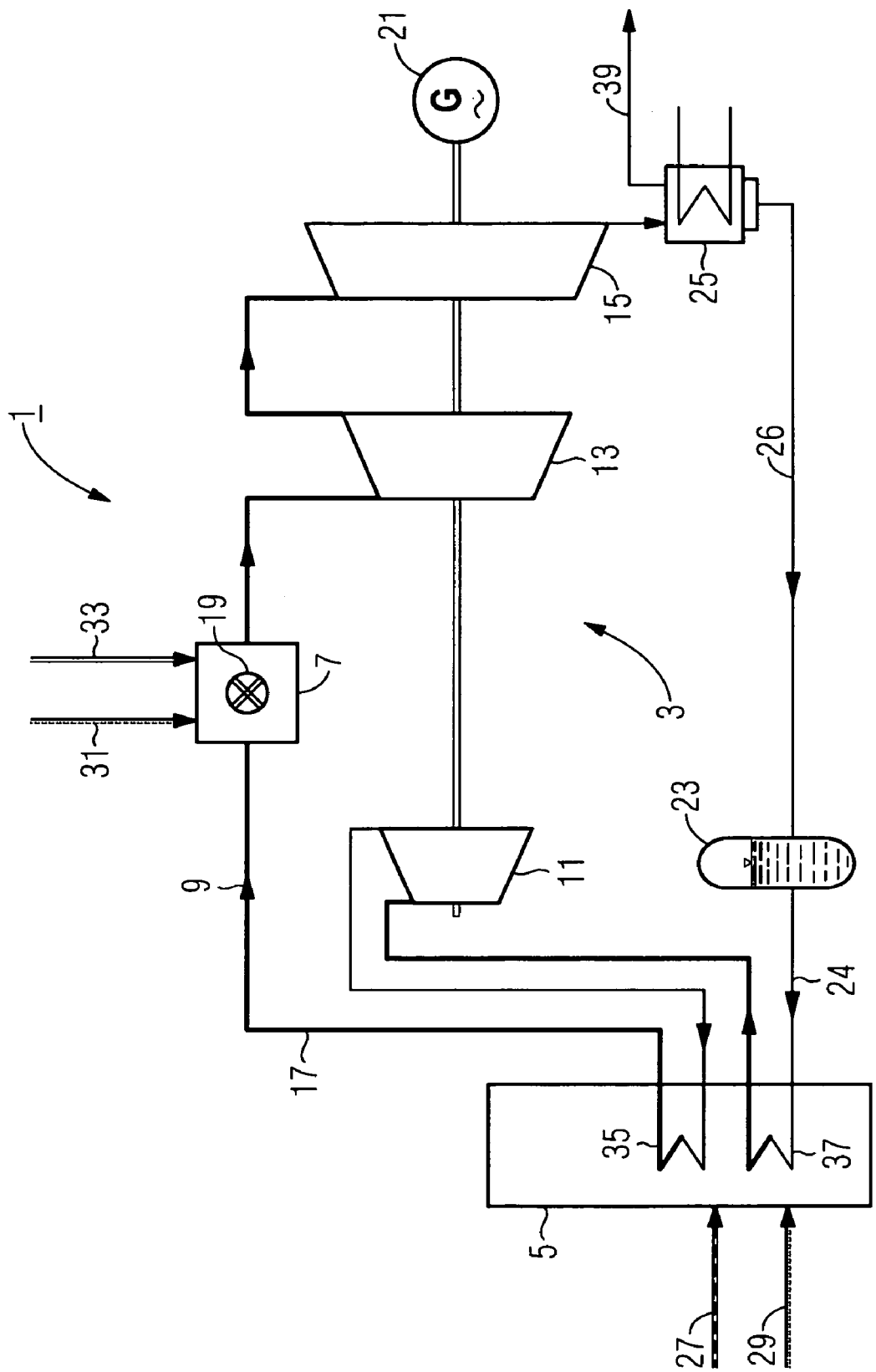

STEAM POWER PLANT

CROSS REFERENCE TO RELATED APPLICATION

This application is the US National Stage of International Application No. PCT/EP2003/005123, filed May 15, 2003 and claims the benefit thereof. The International Application claims the benefits of European Patent application No. 02014453.1 EP filed Jun. 28, 2002, both of the applications are incorporated by reference herein in their entirety.

FIELD OF THE INVENTION

The invention relates to a steam power plant having at least one steam turbine and a steam generator.

BACKGROUND OF THE INVENTION

In known steam power plants, operating steam for a steam turbine is generally generated in a steam generator, the energy contained in a hot gas being released to one or more heat exchangers which are fed with water, so that operating steam can be generated by heating this water, or which are fed with steam, so that the steam can be superheated by means of a said heat exchanger; superheating of this type, in known steam turbines, takes place, for example, between a high-pressure stage and a medium-pressure stage of the steam turbine, the steam which leaves the high-pressure stage being superheated by means of a reheater heating surface arranged in the steam generator and being fed to the medium-pressure stage.

This reheating of the steam makes a contribution, for example, to increasing the efficiency of the steam turbine.

In known steam power plants, thermal energy is supplied in order to generate and/or reheat steam by means of heat exchanger surfaces which are arranged in the steam generator and come into contact with a hot gas guided in the steam generator. The heated heat exchanger surfaces in turn release their thermal energy to water and/or steam guided inside the body formed by a heat exchanger surface. The heating is therefore realized by means of heat transfer from the hot gas to the heat exchanger surface and from the heat exchanger surface to the medium that is to be heated.

Since in the heat exchangers which are known from the prior art and are used in steam generators of known steam power plants the energy of a hot gas is transferred to the medium to be heated by means of a material of the heat exchanger surface that has been heated by the hot gas, the quantity of energy which can be transferred to the medium to be heated, for example water and/or steam, is limited by the materials properties of the heat exchanger surface.

Therefore, in known steam power plants, the permissible steam temperatures are limited, since the heat exchanger surface which transfers the thermal energy cannot be heated to any desired temperature level on account of its material properties and associated thermal loading limits.

Furthermore, the transfer of heat from hot gas to the medium that is to be heated is subject to a delay caused substantially by the required heating time of the heat exchanger surface.

SUMMARY OF THE INVENTION

Therefore, the invention is based on the object of providing a steam power plant having at least one steam turbine and a steam generator which can be used flexibly and in particular overcomes the abovementioned drawbacks of the prior art.

According to the invention, the object is achieved by a steam power plant, comprising at least one steam turbine and a steam generator, in which steam power plant a firing device is arranged downstream of the steam generator and upstream of the steam turbine and/or downstream of a first turbine stage and upstream of a second turbine stage of the steam turbine, as seen in the direction of the flow of steam, and the flow of steam can be heated in a combustion chamber of the firing device by being mixed with a hot gas that can be generated in the combustion chamber.

In this context, the invention is based on the consideration that the transfer of heat from a hot gas to a medium that is to be heated is less restricted compared to the prior art if the transfer of energy to the medium that is to be heated dispenses with the use of a heat exchanger surface.

In the invention, this is achieved by virtue of the fact that the flow of steam which is to be heated is introduced directly into a combustion chamber, where it is mixed directly with the hot gas.

This internal additional firing according to the invention can be used downstream of the steam generator and upstream of the steam turbine, as seen in the direction of flow of steam, i.e. to superheat live steam, or to superheat steam which has already released some of its energy in a turbine stage and is fed to a further turbine stage after superheating according to the invention.

A steam power plant according to the invention can use higher steam temperatures than the prior art, which can contribute to an increase in the efficiency of the steam power plant.

Hydrogen and/or a hydrocarbon, in particular methane, can advantageously be fed to the firing device as fuel.

The use of hydrogen as fuel offers the advantage in particular that—if the hydrogen, as is generally customary, has been produced by reforming or gasification from a hydrocarbon—carbon dioxide which is produced can be blocked with relatively little outlay on energy as early as during production of the hydrogen during reforming or gasification of a hydrocarbon, and in this way the formation of an acidic steam mixture within the steam turbine and/or other components of the steam power plant is avoided from the outset.

To achieve particularly successful firing of the combustion chamber, an oxygen-containing gas, in particular pure oxygen and/or air, can advantageously be fed to the firing device in order to generate a combustion atmosphere.

This embodiment of the invention takes account of the requirement for combustion of a fuel to be possible only in a suitable combustion atmosphere. Particularly efficient combustion is possible by means of the supply of pure oxygen, since this gas, unlike air, does not contain any other constituents which may impede combustion and would under certain circumstances have to be separated off prior to combustion, for example in an air separation device, in order to create a suitable combustion atmosphere.

In a further preferred embodiment of the invention, combustion products which are produced can be removed from the flow of steam by means of a condenser connected downstream of the steam turbine.

Virtually all combustion processes form combustion products, which generally have to be dissipated, since, in particular after a prolonged operating time, they may accumulate in the combustion chamber or other components and restrict the functioning thereof.

If, in a steam power plant according to the invention, for example, hydrocarbon is burnt as fuel in an atmosphere of pure oxygen, at least the combustion products water and carbon dioxide are formed. These combustion products are entrained by the flow of steam and are fed to the condenser. In known steam power plants, there is generally already a condenser, which means that within the context of the invention a separate condenser suitable for removal of the combustion products does not necessarily have to be provided.

During the cooling of the steam which contains the combustion products as a water/carbon dioxide mixture, the water fraction is substantially condensed and what remains is virtually pure, gaseous carbon dioxide which can be removed from the condenser and, for example, stored.

As has already been mentioned, if hydrogen is used as the fuel which is produced by reforming or gasification of a hydrocarbon, carbon dioxide which is produced can be removed even before the fuel is introduced into the firing device, so that in this case scarcely any carbon dioxide is formed as combustion product during the combustion.

The internal additional firing which is realized by means of the firing device of a steam power plant according to the invention can be made available very quickly during operation of the steam turbine. For this purpose, it is merely necessary to ignite fuel which has been introduced into the combustion chamber; in particular, the heat-up times of known heat exchanger surfaces are eliminated.

Furthermore, a steam power plant according to the invention offers the advantage that combustion products and/or exhaust gas do not necessarily have to be discharged from the combustion chamber by means of a separate discharge device, since they can be entrained by the flow of steam and removed elsewhere in the steam circuit, for example the abovementioned condenser. Moreover, the invention makes it possible to reach a higher steam temperature without having to change the design of the steam generator.

A steam power plant according to the invention can in particular also be used to provide energy at peak load times or to boost the mains frequency of an electrical energy supply network; a steam power plant according to the invention offers the possibility of rapid power control and can be used very flexibly.

BRIEF DESCRIPTION OF THE DRAWING

The following text provides a more detailed explanation of an exemplary embodiment of the invention. In the drawing:

The FIGURE shows a steam power plant according to the invention.

DETAILED DESCRIPTION OF THE INVENTION

The FIGURE illustrates a steam power plant 1 according to the invention, which comprises a steam turbine 3 coupled to a generator 21, as well as a steam generator 5.

The steam turbine 3 is of three-stage construction and includes a first turbine stage 11, a second turbine stage 13 and a third turbine stage 15, which are respectively designed as high-pressure stage, medium-pressure stage and low-pressure stage.

In the present exemplary embodiment shown in the FIGURE, the steam generator 5 is a boiler fired by means of coal 27, to which combustion air 29 is fed in order to maintain the coal firing.

A heating surface 37 is arranged in the region of the hot end of the steam generator 5, and a reheater heating surface 35 is arranged in a lower-temperature region of the steam generator 5.

The heating surface 37 is used to heat feedwater 24 from a feedwater vessel 23 in the steam generator 5 in such a manner that operating steam can be fed to the first turbine stage 11.

After partial expansion in the first turbine stage 11, the steam is reheated by means of the reheater heating surface 35. A flow of steam 17 emerges from the reheater heating surface 35 in direction 9 and is fed to a firing device 7. In the process, the flow of steam 17 is heated in a combustion chamber 19 by means of a fuel 33 and addition of oxygen 31, with the flow of steam 17 being mixed in the combustion chamber 19 with the hot gas which is formed in the combustion chamber 19 during the combustion of the fuel 33.

Therefore, the transfer of heat from the hot gas to the flow of steam 17 takes place directly by mixing, without a material, for example a heat exchanger surface, being provided for heat exchange.

As an alternative to oxygen 31, it is also possible to use air to generate a suitable combustion atmosphere, the air being split into oxygen and residual gas by means of an air separation device if appropriate before it is introduced into the combustion chamber.

The fuel 33 used may, for example, be a hydrocarbon, in particular methane, or hydrogen.

The flow of steam 17 which has been heated by means of the firing device 7 is fed to the second turbine stage 13, where it converts at least some of the energy which it contains into mechanical work. The steam which has been further expanded in this way leaves the second turbine stage 13 and is fed to the third turbine stage 15, where the energy which is still present in the steam is converted as fully as possible into mechanical energy.

The expanded steam leaves the third turbine stage 15 as a water-steam mixture and is fed to a condenser 25, where the steam fraction which is still present is condensed to form water.

This water which collects in the condenser 25 is fed to the feedwater vessel 23 as condensate 26.

Combustion products 39 which are formed during combustion in the combustion chamber 19 of the firing device 7 can be removed from the condenser 25.

Since the combustion takes place within the flow of steam 17 in the combustion chamber 19, the combustion products 39 are entrained by the flow of steam 17 in the steam circuit and according to this embodiment of the invention are removed from the condenser 25.

If the fuel 33 burnt is, for example, a hydrocarbon together with oxygen 31, the combustion products 39 comprise water and carbon dioxide. This water/carbon dioxide mixture is entrained by the flow of steam 17 and can be removed from the condenser 25, since the water fraction is substantially condensed during the cooling of the water/carbon dioxide mixture and virtually pure gaseous carbon dioxide remains as gas which can then be transported away and, for example, stored.

Water as combustion product of course does not usually have to be discharged, but rather can be fed to the feedwater vessel 23 as a constituent of the condensate 26.

The invention claim is:

1. A steam power plant, comprising:
   a steam turbine having a first turbine stage and a second turbine stage;

a steam generator coupled to receive a feedwater supply and provide a steam supply to the first turbine stage, said generator further coupled to circulate therethrough steam from an outlet of the first turbine stage for initial reheating prior to entry into the second turbine stage;

a firing device arranged to further heat steam after the initial reheating and prior to entry into the second turbine stage; and a combustion chamber associated with the firing device in which steam flowing there through can be heated by being mixed with a hot gas generated in the combustion chamber.

2. The steam power plant as claimed in claim 1, wherein the firing device is fueled by methane.

3. The steam power plant as claimed in claim 1, wherein an oxygen-containing gas is fed to the firing device in order to generate a combustion atmosphere in the combustion chamber.

4. The steam power plant as claimed in claim 1, wherein combustion products produced are removed from the flow of steam by a condenser connected downstream of the second stage of the steam turbine.

* * * * *